(12) United States Patent
Kowalewski

(10) Patent No.: US 7,203,165 B1
(45) Date of Patent: Apr. 10, 2007

(54) DATA TRANSMISSION DEVICE AND METHOD

(75) Inventor: Frank Kowalewski, Salzgitter (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/936,115

(22) PCT Filed: Feb. 15, 2000

(86) PCT No.: PCT/DE00/00430

§ 371 (c)(1),
(2), (4) Date: Jan. 2, 2002

(87) PCT Pub. No.: WO00/54449

PCT Pub. Date: Sep. 14, 2000

(30) Foreign Application Priority Data

Mar. 6, 1999 (DE) .............................. 199 09 921

(51) Int. Cl.
*H04L 12/26* (2006.01)
*H04Q 7/00* (2006.01)

(52) U.S. Cl. .................. 370/230; 370/235; 370/332

(58) Field of Classification Search ......... 370/328–339
See application file for complete search history.

(56) References Cited

U.S. PATENT DOCUMENTS

| 5,479,444 | A | | 12/1995 | Malkamaki et al. | |
| 5,509,007 | A | | 4/1996 | Takashima et al. | |
| 6,212,243 | B1 | * | 4/2001 | Klein et al. ................ | 375/316 |
| 6,289,217 | B1 | * | 9/2001 | Hamalainen et al. ....... | 455/425 |
| 6,407,993 | B1 | * | 6/2002 | Moulsley ................... | 370/347 |
| 6,577,617 | B1 | * | 6/2003 | Ue et al. .................... | 370/347 |

FOREIGN PATENT DOCUMENTS

| DE | 197 24 027 | 12/1998 |
| EP | 0 607 970 | 7/1994 |
| EP | 0 615 352 | 9/1994 |
| WO | WO98 37594 | 8/1998 |

OTHER PUBLICATIONS

K.D. Kammeyer, "Nachrichtenübertragung (Transmission of Communications)", 2nd Edition, Information Technology Series, Teubner, Stuttgart, 1996 pp. I-XVIII;731-746.
A. Klein et al., "Zero Forcing and Minimum Mean-Square-Error Equalization for Multiuser Detection in Code-Division Multiple-Access Channels", IEEE Trans. Vehic. Tech., vol. 45 (1996), 276-287.
R. Esmailzadeh et al., "Pre-Rake Diversity Combination for Direct Sequence Spread Spectrum Mobile Communications Systems", IEICE Trans. Comm., vol. E76-B (1993), 1008-1015.
Matsuoka, H. et al., "Adaptive Modulation System With Variable Coding Rate Concatenated Code For High Quality Multi-Media Communication Systems" Proceedings of the Vehicular Technology Conference, IEEE, Vo. 1, Apr. 28, 1996, 487-491.
Yuen, E., et al., "Variable Rate Speech And Channel Coding For Mobile Communication" Proceeding of the Vehicular Technology Conference, IEEE, vol. 3, Jun. 8, 1994, pp. 1709-1713.
A Treatise disclosed in Weekly Technical Trend No. 860, pp. 14-25, Aug. 10, 1998.

* cited by examiner

*Primary Examiner*—Chi Pham
*Assistant Examiner*—Tri H. Phan
(74) *Attorney, Agent, or Firm*—Kenyon & Kenyon LLP

(57) ABSTRACT

A data transmission device is described which may use multiple data transmission technologies and/or multiple data transmission parameters of one or more data transmission technologies, having at least one transmitting device and one receiving device which can communicate with one another over at least one data transmission channel. A determination device for determining the transmission properties of the data transmission channel(s) for multiple data transmission technologies and/or multiple data transmission parameters of one or more data transmission technologies, and a selector device for selecting a certain data transmission technology having certain data transmission parameters according to the result of the determination, are additionally provided so as to be able to accommodate different transmission properties.

10 Claims, 3 Drawing Sheets

DATA TRANSMISSION DEVICE AND METHOD

FIELD OF THE INVENTION

The present invention relates to a data transmission device which may use multiple data transmission technologies and/or multiple data transmission parameters of one or more data transmission technologies, having at least one transmitting device and one receiving device which can communicate with one another over at least one data transmission channel. The present invention also relates to a corresponding data transmission method.

BACKGROUND INFORMATION

Although the present invention can be used with all desired data transmission technologies, it is explained here together with the problems on which it is based from the standpoint of mobile wireless technology.

There are various conventional technologies for multi-channel wireless transmission, in particular TDMA (time division multiple access), e.g., GSM (global system for mobile telecommunications) or UMTS (universal mobile telecommunication system), FDMA (frequency division multiple access), e.g., DECT (digital enhanced telecommunication), GSM (global system for mobile telecommunications), DAB (digital audio broadcasting) and CDMA (code division multiple access) (IS95, UMTS).

Problematic interference which can occur with these different technologies is usually handled in different ways, if at all. In particular, conventional methods include elimination of intersymbol interference (ISI), elimination of multiple access interference (MAI), elimination of interference in the receiver, e.g., by equalizers or multiuser methods or joint detection methods, as well as elimination in the sender by pre-rake or joint preliminary equalization. See, for example, K. D. Kammeyer, "Nachrichtenübertragung [Transmission of Communications]," $2^{nd}$ edition, *Information Technology Series*, Teubner, Stuttgart, 1996, and A. Klein, G. K. Kaleh and P. W. Baier, "Zero Forcing and Minimum Mean-Square-Error Equalization for Multiuser Detection in Code-Division Multiple-Access Channels," *IEEE Trans. Vehic. Tech.*, vol. 45 (1996), 276–287 and R. Esmailzadeh and M. Nakagawa, "Pre-Rake Diversity Combination for Direct Sequence Spread Spectrum Mobile Communications Systems," *IEICE Trans. Comm.*, vol. E76-B (1993), 1008–1015.

In addition, different parameters are generally used under different transmission conditions, e.g., in the UMTS TDD mode, where different types of bursts are used, depending on the maximum channel delay. In this regard, see, the example, the UMTS-L1 expert group: "UTRA Physical Layer Description, TDD parts, V 0.2.0."

One disadvantage of the conventional approaches is that a transmission technology having a given set of parameters is more advantageous than another transmission technology only under certain transmission conditions or with certain transmission properties of the data transmission channel.

Therefore, it may occur that an unnecessarily low transmission quality prevails under certain transmission conditions or there may be an unnecessarily great dependence of transmission quality on transmission conditions.

It would thus be desirable to create a data transmission system which can always guarantee optimum transmission quality, regardless of whether data transmission conditions are variable or constant.

SUMMARY

In accordance with an example embodiment of the present invention, a data transmission device is provided in which it is possible to accommodate different transmission properties.

In other words, it is possible to improve the data transmission under variable transmission conditions or to have data transmission quality be largely independent of transmission conditions. Assuming uniform transmission conditions, the resulting transmission quality will be either the same or better.

In accordance with the example embodiment, a determination device may be provided for determining the transmission properties of the data transmission channel(s) for multiple data transmission technologies and/or multiple data transmission parameters of one or more data transmission technologies and to provide a selector device for selecting a certain data transmission technology having certain data transmission parameters according to the result of the determination.

According to one example embodiment, a selector device may be provided in the transmitting device.

According to another example embodiment, the selector device may be provided in the receiving device.

According to another example embodiment, the data transmission channel is a wireless channel.

According to another example embodiment, the determination device is designed to determine the rate of change of the data transmission channel.

According to another example embodiment, the selector device makes the selection in such a way that interference in the receiving device is eliminated when the rate of change of the data transmission channel exceeds a predetermined value, and interference in the transmitting device is eliminated when the rate of change of the data transmission channel drops below a predetermined value.

According to another example embodiment, the determination device is designed to determine the maximum delay of the data transmission channel.

According to another example embodiment, the selector device makes the selection in such a way that it selects a transmission technology having a certain burst structure as a function of the maximum delay determined for the data transmission channel.

According to another example embodiment, the selector device makes the selection in such a way that it selects a transmission technology having a certain reference signal as a function of the maximum delay determined for the data transmission channel and/or the rate of change determined.

According to another example embodiment, the data transmission device is a mobile wireless device, for example, a mobile telephone.

DETAILED DESCRIPTION

In the figures, the same reference numbers denote the same components or those having the same function.

Figure 1:
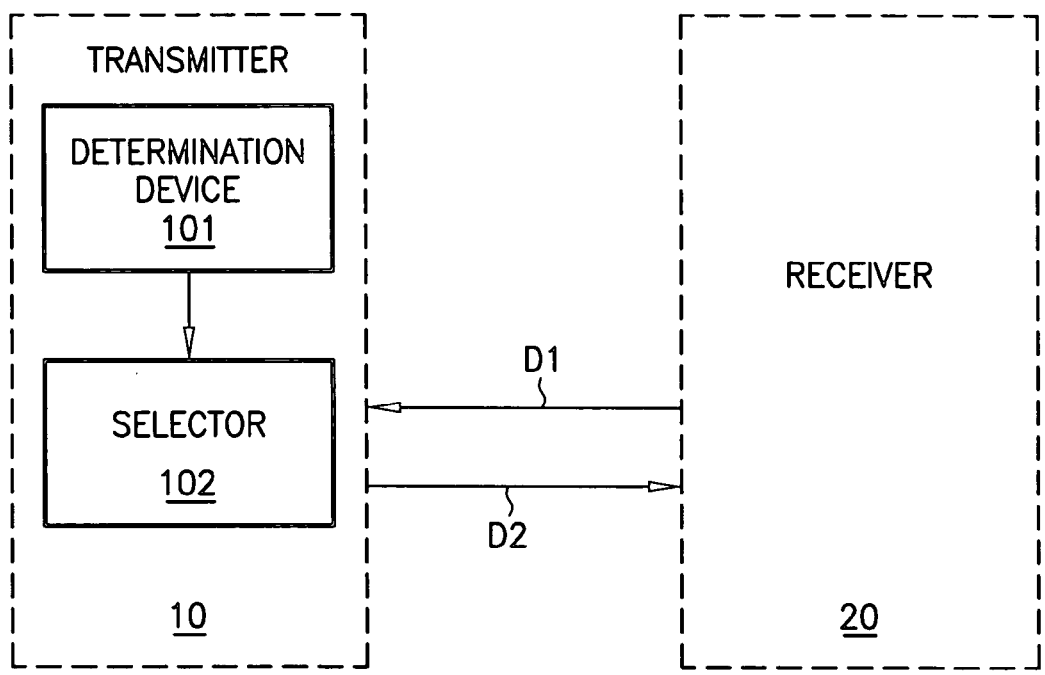
FIG. 1 shows a schematic diagram of a data transmission device according to a first example embodiment of the present invention.

FIG. 1 shows a schematic diagram of a data transmission device according to a first embodiment of the present invention.

FIG. 1 shows a transmitter 10, a receiver 20, a determination device 101 for determining the transmission properties of the transmission channel, a selector device 102 for selecting a certain data transmission technology having certain data transmission parameters as well as data messages D1 and D2.

As shown in the diagram of FIG. 1, transmitter 10 first sends an inquiry to receiver 20, requesting it to respond with various transmission technologies and parameters. Receiver 20 then sends data message D1 to transmitter 10, indicating which technologies and respective parameters are supported.

Determination device 101 then determines the transmission properties of the data transmission channel(s), and selector device 102 selects a certain data transmission technology having certain data transmission parameters according to the result of the determination.

Transmitter 10 notifies receiver 20 of the technology selected and the respective parameters in data message D2.

Figure 2:
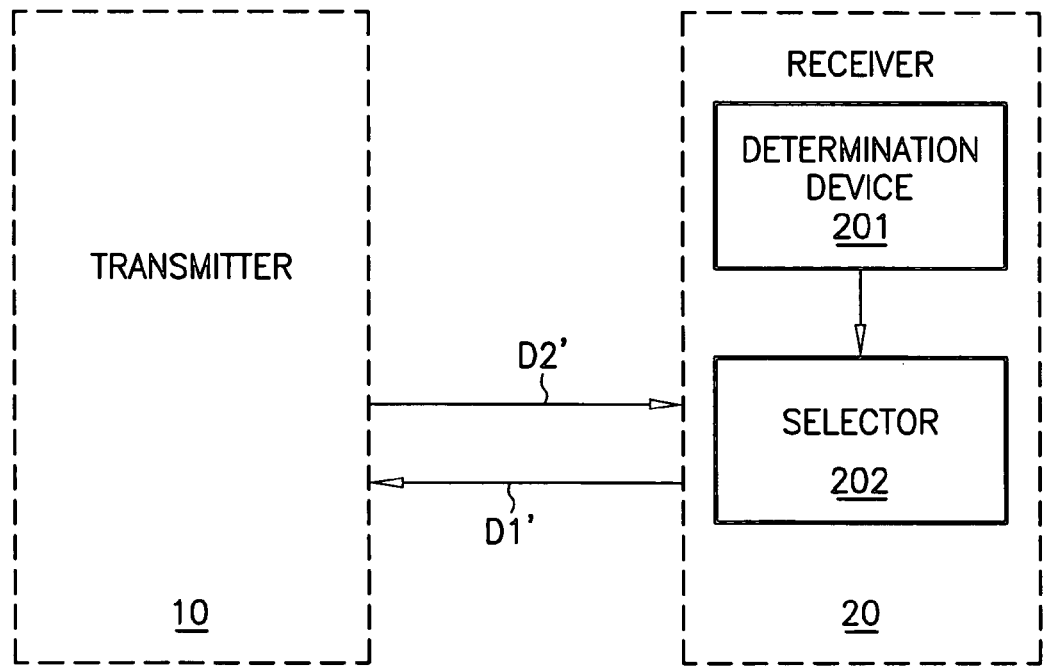
FIG. 2 shows a schematic diagram of a data transmission device according to a second example embodiment of the present invention.

FIG. 2 shows a schematic diagram of a data transmission device as a second example embodiment of the present invention.

In addition to the determination device already introduced, FIG. 2 also shows a determination device 201 for determining the transmission properties of the data transmission channel, a selector device 202 for selecting a certain data transmission technology having certain data transmission parameters as well as data messages D1' and D2'.

As shown in the diagram in FIG. 2, receiver 20 first sends an inquiry to transmitter 10, requesting it to respond with various transmission technologies and parameters. Transmitter 10 then sends data message D2' to receiver 20, indicating which technologies and respective parameters are supported.

Determination device 201 then determines the transmission properties of the data transmission channel(s), and selector device 202 selects a certain data transmission technology having certain data transmission parameters according to the result of the determination.

Receiver 20 notifies transmitter 10 of the technology selected and the respective parameters in data message D1'.

Figure 3:
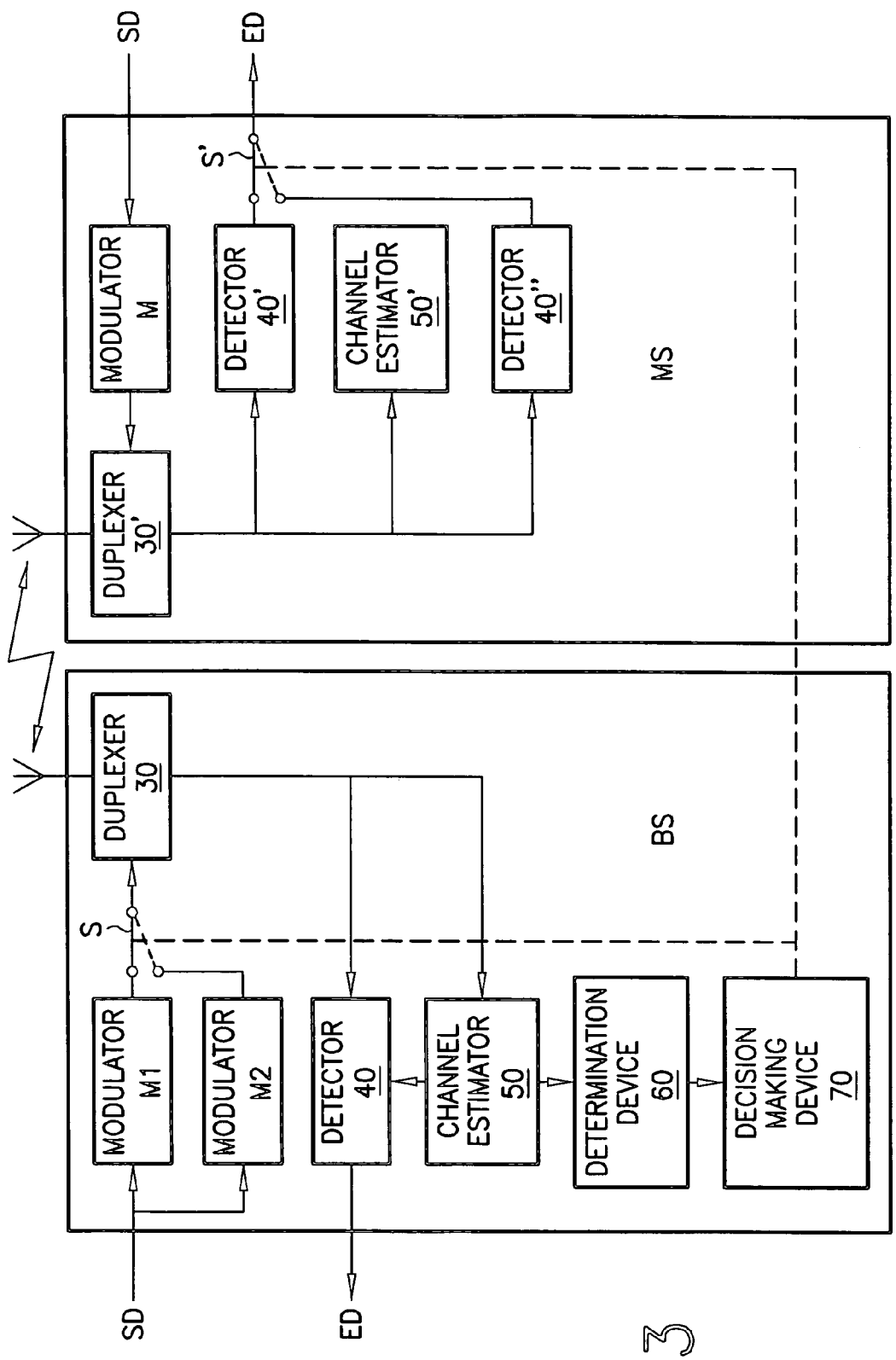
FIG. 3 shows a schematic diagram of a data transmission device according to a third example embodiment of the present invention.

FIG. 3 shows a schematic diagram of a data transmission device according to a third example embodiment of the present invention.

The data transmission device shown in FIG. 3 is a cellular wireless transmission system in which there is a transmission from a base station BS to multiple mobile stations MS in the forward link and transmission from multiple mobile stations MS to base station BS in the reverse link. Data streams of various users (mobile stations MS) are separated by code division multiple access (CDMA), for example.

In the TDD wireless transmission system shown here, the forward and reverse links are in the same frequency band. The forward and reverse links are separated in time by alternating transmission of transmission bursts in the forward and reverse links.

Interference in the forward link is eliminated optionally either in the transmitter or in the receiver, e.g., by eliminating interference in the transmitter through joint preliminary equalization or by eliminating interference in the receiver through joint detection as described in the article by Klein et al. (discussed above).

An example of selecting the technology for eliminating interference in the forward link would be to determine the rate of change of the wireless channel by comparing successive channel estimates in the base station and to eliminate interference through joint preliminary equalization in the transmitter if the rate of change is below a certain threshold, and to eliminate interference through joint detection in the receiver if the rate of change is above the threshold.

FIG. 3 shows transmitted data SD, received data ED, duplexers 30 and 30', a modulator M1 without preliminary equalization, a modulator M2 having preliminary equalization, a modulator M, detectors 40, 40' and 40", a channel estimator 50 and 50', a determination device 60 and a decision-making device or selector device 70. Switches S and S' can be switched by decision-making device 70.

Base station BS has a transmission part having modulators M2 and M1 with and without preliminary equalization, respectively, and a reception part having detector 40 and channel estimator 50 as well as a decision-making part for making a decision between preliminary equalization and joint detection, composed of determination device 60 and decision-making device 70. Selector switch S is used to select modulator M1 or M2. Selector switch S is controlled by decision-making device 70.

Mobile station MS has a transmission part having modulator M and a reception part having channel estimator 50', as well as detector 40' for joint detection and detector 40" for simple detection.

Decision-making device 70 in base station BS selects either no preliminary equalization in base station BS and joint detection in mobile station MS, or preliminary equalization in base station BS and simple detection in mobile station MS, depending on the result obtained by channel estimator 50 and determination device 60. The decision made by decision-making device 70 of base station BS is relayed to mobile station MS over the wireless interface.

Figure 4:
FIG. 4 shows burst structures for estimating short and long channels.
Figure 4:

FIG. 4 shows burst structures for estimating short and long channels.

Another example of a cellular wireless transmission system as an embodiment of the data transmission device according to the present invention has block-wise data transmission in a data burst structure as illustrated in FIG. 4, where DB1 denotes a first data block, DB2 is a second data block, and MA is a midamble connected between them, with time t running from left to right.

The reverse link is optionally one of two possible burst structures, namely a burst structure having long data blocks and a short midamble, and a burst structure having short data blocks and a long midamble. The choice of data burst structure is made on the basis of a determination of the maximum channel delay by the mobile station in the forward link.

The choice of burst structure for the reverse link is made according to the maximum delay determined, namely a long midamble MA with long delays and a short midamble with short delays.

The type of burst that has been transmitted is determined in the receiver on the basis of the signal received. This embodiment can be used in particular in UMTS TDD mode.

Figure 5:
FIG. 5 shows burst structures for estimating slowly and rapidly variable channels.
Figure 5:
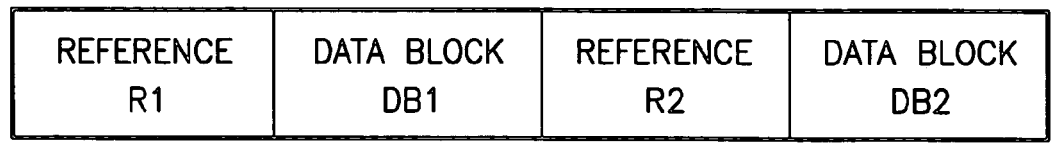

FIG. 5 shows burst structures for estimating slowly and rapidly variable channels.

In this embodiment in the form of a cellular wireless transmission system, there is block-wise data transmission in a data burst structure. Reference signal R or R1 or R2 and data block DB or DB1 or DB2 are sent in chronological order. One of two possible burst structures is optionally used, namely a long reference signal R and a long data block DB or multiple short reference signals R1, R2 which are separated from one another by reduced data blocks DB1, DB2.

The burst structure is selected by determining the rate of change in the wireless channel with the help of the reference signal by a comparison of successive channel estimates in base station BS or in mobile station MS.

The burst having a long reference signal R is selected if the rate of change of the channel is below a certain threshold, and the burst having multiple short reference signals R1, R2 is selected if the rate of change is above the threshold.

The type of burst that has been transmitted is determined in the receiver on the basis of the received signal. This embodiment can also be used for the UMTS standard.

Although the present invention is described above on the basis of example embodiments, it is not limited to these embodiments, but instead can be modified in various ways.

Another example embodiment includes a wireless transmission system which supports various standards such as transmission according to the GSM standard and transmission according to the USTM standard.

A determination of the rate of change of the wireless channel and the maximum channel delay could be provided here. The choice of the transmission technology and the respective transmission parameters could be made by optimizing the data transmission quality at the measured rate of change and the measured delays.

Contrary to the description of the above example embodiments, the transmitter or receiver can also notify its remote station, without being explicitly required to do so, regarding which transmission technologies and parameters it supports, e.g., directly after establishing the connection.

What is claimed is:

1. A data transmission device for use with multiple data transmission technologies and/or multiple data transmission parameters of one or more data transmission technologies, comprising:
    a transmitting device and a receiving device configured to communicate with one another over at least one data transmission channel;
    a determination device configured to determine transmission properties of the at least one data transmission channel, the properties being at least one of: i) properties of multiple data transmission technologies, and ii) multiple data transmission parameters of at least one data transmission technology; and
    a selector device coupled to the determination device and to at least one of the transmitting device and the receiving device, the selector device being configured to select a certain data transmission technology having certain data transmission parameters according to a result of the determination;
    wherein the determination device is configured to determine a rate of change of the data transmission channel, and
    wherein the selector device is configured to make the selection so that interferences in the receiving device are eliminated when the rate of change of the data transmission channel exceeds a predetermined value, and interferences in the transmitting device are eliminated when the rate of change of the data transmission channel drops below a predetermined level.

2. The data transmission device according to claim 1, wherein the selector device is coupled to the transmitting device.

3. The data transmission device according to claim 1, wherein the selector device is coupled to the receiving device.

4. The data transmission device according to claim 1, wherein the data transmission channel is a wireless channel.

5. The data transmission device according to claim 1, wherein the determination device is configured to determine a maximum delay of the data transmission channel.

6. The data transmission device according to claim 1, wherein the selector device is configured to make the selection so that a transmission technology having a certain reference signal is selected as a function of at least one of: i) a maximum delay for the data transmission channel, and ii) a rate of change of the data transmission channel.

7. The data transmission device according claim 1, wherein the data transmission device is a mobile wireless device.

8. The data transmission device according to claim 7, wherein the data transmission device is a mobile telephone.

9. A data transmission device for use with multiple data transmission technologies and/or multiple data transmission parameters of one or more data transmission technologies, comprising:
    a transmitting device and a receiving device configured to communicate with one another over at least one data transmission channel;
    a determination device configured to determine transmission properties of the at least one data transmission channel, the properties being at least one of: i) properties of multiple data transmission technologies, and ii) multiple data transmission parameters of at least one data transmission technology; and
    a selector device coupled to the determination device and to at least one of the transmitting device and the receiving device, the selector device being configured to select a certain data transmission technology having certain data transmission parameters according to a result of the determination;
    wherein the determination device is configured to determine a maximum delay of the data transmission channel, and
    wherein the selector device is configured to make the selection so that a transmission technology having a certain burst structure is selected as a function of the maximum delay determined for the data transmission channel.

10. A data transmission method for use with multiple data transmission technologies and/or multiple data transmission parameters of one or more data transmission technologies for implementation on at least one transmitting device and one receiving device which can communicate with one another over at least one data transmission channel, the method comprising:
    determining transmission properties of the at least one data transmission channel, the properties being at least one of: i) properties of multiple data transmission technologies, and ii) multiple data transmission parameters of at least one data transmission technologies; and selecting a certain data transmission technology having certain data transmission parameters according to the determination;

wherein the determining determines a rate of change of the at least one data transmission channel, and wherein the selecting selects so that interferences in the receiving device are eliminated when the rate of change of the at least one data transmission channel exceeds a predetermined value, and interferences in the transmitting device are eliminated when the rate of change of the at least one data transmission channel drops below a predetermined level.

* * * * *